Oct. 30, 1928.

W. N. GOODWIN, JR 1,689,871

APPARATUS FOR TESTING VACUUM TUBES OF THE AUDION TYPE

Filed May 18, 1926

Inventor:
William N. Goodwin, Jr

By Byrne Townsend & Brickenstein,
Attorneys.

Patented Oct. 30, 1928.

1,689,871

UNITED STATES PATENT OFFICE.

WILLIAM NELSON GOODWIN, JR., OF NEWARK, NEW JERSEY.

APPARATUS FOR TESTING VACUUM TUBES OF THE AUDION TYPE.

Application filed May 18, 1926. Serial No. 109,999.

This invention consists in new and useful improvements in instruments and methods for measuring the constants of vacuum tubes of the audion type namely, amplification factor, mutual conductance, and plate impedance by direct reading methods.

A number of different methods have been devised and are now in use for the same purpose, but they either require computation from observed values, or are based upon bridge methods which require operating currents of 800 to 1000 cycles in order that a telephone may be used for balancing the bridge. Currents of this frequency can not readily be obtained even in laboratories. Further, this method is laborious, and time consuming.

I have invented and describe below an instrument which will measure the dynamic value of all the tube constants referred to, directly, without the necessity of computation, using an instrument of the direct reading deflecting type, and as a source of measuring current the ordinary 60 cycle alternating current as usually employed for lighting purposes may be used.

Objects of my invention are to provide a method of and apparatus for reading the absolute value of a tube constant as the displacement of a pointer along a scale. Further objects are to provide methods and apparatus by which currents proportional to the electrical properties whose ratio defines a tube constant are caused to traverse the coils of a ratio meter for the purpose of obtaining a direct indication of the absolute value of the desired ratio.

Another object of my invention is to provide an instrument and associated circuits by which a tube constant is measured by applying currents dependent upon the value of the constant to a meter.

A further object is to provide apparatus which is simple to operate and yet will give direct readings of various tube constants.

Another object is to provide an instrument having a scale for tube constants calibrated directly so that no computations or reference to charts are necessary when a reading is desired.

These and other objects of the invention will be apparent from the following specification when taken with the accompanying drawings, in which.

Figure 1:
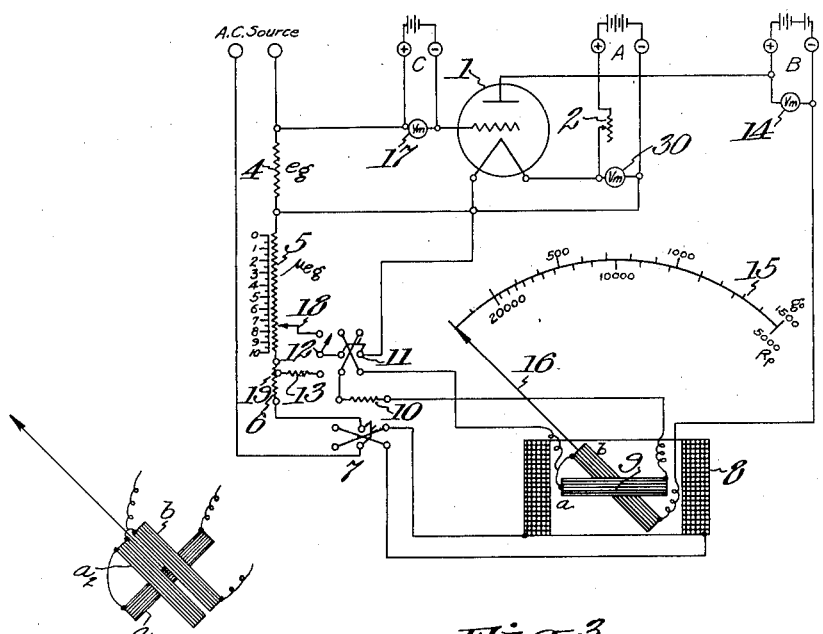
Fig. 1 shows one form of the instrument and its component parts.

The tube to be tested is shown at 1. The usual A, B and C batteries are connected to it as shown, for the purposes respectively of heating the filament and applying the proper voltage to the plate and the proper bias to the grid. The rheostat 2 is used to control the filament voltage which is indicated by the voltmeter 30. Voltmeters 14 and 17 indicate the B and C battery voltages respectively. These voltages may all be measured if desired by one voltmeter, and the connections to the various circuits made by means of a switch, as is well known to the art. One of the novel features of the testing set is the use of an electrodynamometer ratio meter, that is, one, the movable system 9, of which consists of two coils $a$ and $b$ rigidly fastened together but angularly displaced from each other, as shown. These coils are capable of rotating together within the fixed field coil shown in section at 8 which is energized by an alternating current from an A. C. source which if desired may be from the ordinary 110 volt lighting circuit at a frequency of 60 cycles per second, or it can be designed for any other frequency and voltage.

The two movable coils are shown set at an angle of 45° from each other as this arrangement gives good scale characteristics. This particular angle, however, is not essential. A simple method for obtaining an equivalent of the angular displacement of the two coils is shown in Fig. 2 where the coils $a_1$ and $a_2$ are wound at right angles to each other and, when properly connected in series, are electrically equivalent to coil $a$ in Fig. 1. Coil $b$ wound parallel to coil $a_2$ in Fig. 2 corresponds and is equivalent to coil $b$ in Fig. 1. A pointer 16 attached to the movable system passes over scale 15 and indicates values of constants as described below.

Connected in the A. C. circuit are the resistors 4, 5 and 6 and also the field coil of the instrument. This latter is done simply for convenience, since the field coil may be energized from the A. C. source in any manner so that the current is approximately of the proper value and approximately in phase with the current through resistors 4 and 5.

Resistor 4 is for the purpose of providing excitation for the grid of the tube. That is, the alternating drop across this resistor is applied between the filament and grid of the tube, which produces a periodic variation in grid potential, which in turn causes a corresponding pulsation in plate current in the tube in accordance with the well known law of the tube. This pulsating current may be considered as consisting of a constant direct current as supplied by the B battery upon which is superposed an alternating current equal to $$Ip = \mu \frac{e_g}{Rp}$$

where $\mu$ is the amplification constant, $e_g$ the grid voltage and $Rp$ the plate impedance.

This equation is the well known relation of the constants of the tube.

Resistor 5 is a variable resistor, having a sliding contact 18 which is connected as shown through switches 12 and 11 to the instrument and the other end of the resistor 5. When switches 12 and 11 are connected to the upper contacts, then resistor 5 is in parallel with coil $a$ of the instrument and an adjusting resistor 10. When switches 12 and 11 are connected to the lower contacts, then the coil $a$ is connected in parallel with a definite and fixed portion of resistor 5, or all of 5 and a portion of resistor 6, as the design requires which will be described below. The resistor 13 is an additional adjusting resistor.

Resistor 5 is for the purpose of providing a voltage in a known ratio to voltage $e_g$ produced by resistor 4, to apply to the ratio meter. Coil $b$ of the ratio meter is connected in series with the plate circuit of the tube.

The method of making the measurements is as follows:

To measure $\mu$, the amplification constant:

Switches 12 and 11 are connected to the upper contacts, by which the voltage drop across resistor 5, and its parallel circuit which includes coil $a$, is caused to oppose the voltage generated in the plate circuit by the grid voltage. The slider 18 on resistor 5 is then moved until the instrument pointer stands at zero, which indicates that the current in the plate circuit and in coil $b$ is zero, since with no current in coil $b$, current in coil $a$ places its axis parallel to that of the field coil, at which position the scale is calibrated zero. The ratio of the voltage across the resistor 5 from the position marked zero where it joins resistor 4 to the slider, to the voltage across 4, is the amplification constant $\mu$ which is equal to the ratio of the resistance of the resistor 5 with the instrument circuit in parallel with it R to the resistance $r$ of the resistor 4. A scale may be provided along the slider which can be graduated in terms of amplification constant.

This is proved as follows: The grid voltage applied by the drop across resistor 4 is $e_g = Ir$ where I is the current through the resistor 4 the resistance of which is $r$.

The voltage produced by the grid in the plate circuit is $\mu e_g = \mu Ir$ which is the well known law of the tube.

This voltage is opposed by the voltage from resistor 5 which is IR. When the plate circuit is reduced to zero, then these voltages are equal or $$IR = \mu Ir$$
$$\mu = \frac{\text{volts across R}}{\text{volts across } r} = \frac{R}{r}$$

To measure plate impedance $Rp$:

Leave the slider at the position corresponding to the amplification constant just determined, set switch 12 to the upper contact, and switch 11 to the lower contacts. The instrument will then indicate the plate impedance on a properly calibrated scale. This is proved as follows:

As is well known in ratio meters of the crossed coil type as shown, the movable system tends to take a position depending upon the ratio of the currents in its two coils. For the particular coils shown, having an angular displacement of 45° it can be shown that the angular displacement, $\theta$, from the zero position is related to the ratio of the currents in the two coils in accordance with the following equation:

$$\frac{i_1}{i_2} = \frac{1}{2}\sqrt{2}\left(\frac{n_2}{n_1}\right)\left(1 + \frac{1}{\tan\theta}\right)$$

or $$\frac{i_2}{i_1} = \frac{n_1}{n_2}\left(\frac{\sqrt{2}}{1 + \cot\theta}\right)$$

where $i_1$ and $i_2$ are the currents in coils $a$ and $b$, respectively, and $n_1$ and $n_2$ are the corresponding number of turns if the two coils have the same effective area, which is the usual practice, if not, then $n_1$ and $n_2$ are functions of both the areas and number of turns.

Now from the fundamental laws of the audion tube, the plate impedance $Rp = \frac{\mu e_g}{Ip}$, where as before $\mu$, $e_g$ and $Ip$ are the amplification constant, alternating grid voltage, and alternating plate current respectively. Therefore, if we pass current $Ip$ through coil $b$, and a current proportional to $\mu e_g$ through coil $a$, the instrument deflection will be a direct measure of the ratio of the two, that is $Rp$. Since the slider on resistor 5 is allowed to remain at the position corresponding to $\mu$ on the slider scale, it is obvious that the current through coil $a$ is proportional to $\mu e_g$, so that the instrument scale can be calibrated directly in terms of plate impedance.

To measure mutual conductance $g$:

Set switches 12 and 11 to their lower contacts. Then the deflection of the instrument is a measure of the mutual conductance, and the scale can be calibrated directly in values of $g$. This is proved as follows: Again from the fundamental laws of the audion tube the mutual conductance $$g = \frac{Ip}{e_g}.$$

If therefore we pass the plate current $Ip$ through coil $b$ and pass a current which is always proportional to $e_g$ through coil $a$, the deflection is a measure of the ratio of the two, that is $g$.

The current through $a$ is obtained from the fixed connection at any suitable place on resistor 5 or 6, shown at 19. Resistors 13 and 10 are used to give the desired current from this voltage drop which is always proportional to the grid voltage $e_g$.

Switch 7 is for the purpose of reversing the current in the field coil when switch 11 is reversed. These switches 7, 11 and 12 are shown as independent switches for simplicity of description, but in practice they can be rotating contactors all arranged on a common shaft and operated simultaneously in the proper sequence for measuring $\mu$, $Rp$ and $g$.

Figures 2, 3:
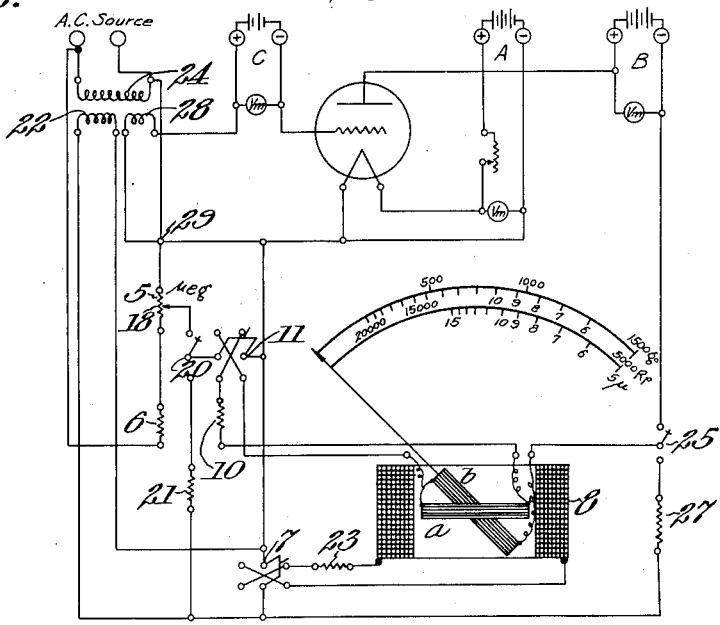
Fig. 2 shows a detail view of the crossed coils of my instrument.
Fig. 3 is a view similar to Fig. 1 but showing a modified form.

I do not limit myself to the use of resistors for 4, 5 and 6 in Fig. 1, for these may be replaced by transformers either of the two circuit or of the auto transformer type in which the points marked 0, 1, 2, 3, etc. 19, and the connections to grid and filament may be taps on the transformer winding. In this case, the field coil 8 would be energized from a separate transformer or through an independent resistor, as shown in Fig. 3.

Fig. 3 shows an arrangement by which the instrument can also be used to indicate directly upon the scale the value of the amplification factor, $\mu$, as well as the other constants $g$ and $Rp$, instead of having to use a calibrated resistor as described for Fig. 1.

The method is as follows, referring to Fig. 3. The field coil 8 is energized from one of the secondary windings 22, of a transformer 24, having two secondary windings 22 and 28, whose primary is directly across the binding posts connected to the source of the A. C. voltage.

The secondary winding 28 supplies an alternating voltage to the grid, of the proper voltage and in phase, or nearly in phase, with the A. C. source.

Across the A. C. source are connected resistors 5 and 6 in series. Resistor 5 is a rheostat having a sliding contact, and 6 is a fixed resistor to limit the current in the circuit to the proper amount. One end 29 of resistor 5 is also connected to a filament terminal. When switch 20 is set at upper contact, the part of resistor 5 between 29 and 18 is shunted by coil $a$ of the instrument and resistor 10.

The resistor 23 limits the field current to the proper value.

To measure the amplification factor:

First set switches 20, 11, and 25 at their upper contacts. Adjust slider 18 on resistor 5 until the instrument indicates zero. In this condition the voltage $\mu e_g$ generated in the plate circuit by the action of the grid voltage $e_g$ is balanced by the opposing voltage across resistor 5 and the circuit in parallel to it which includes the coil $a$. Coil $a$ is connected in a circuit in parallel with resistor 5 in order to cause a current to flow in coil $a$ which shall be proportional to the voltage drop across resistor 5. Then to indicate the amplification factor, change switches 25 and 11 to their lower contacts, leave switch 20 upward. Then since coil $a$ is supplied with current proportional to the voltage drop across rheostat 5 from 29 to 18, that is proportional to $\mu e_g$, and coil $b$ is supplied with current proportional to the voltage of the A. C. source, which in turn is proportional to the voltage supplied to the grid, $e_g$, it follows that the deflection is a measure of the ratio of these two voltages or $\mu e_g/e_g = \mu$ the amplification factor, which can be read directly from a calibrated scale.

To measure plate impedance $Rp$:

Set switches 20 and 25 to upper contacts, and switch 11 to its lower contacts, then for the same reasons as given for Fig. 1 the instrument indicates the plate impedance $Rp$.

To measure mutual conductance $g$:

Set switches 20 and 11 to their lower contacts and 25 to its upper contact. Then coil $b$ carries a current $Ip$ of the plate circuit, and coil $a$ a current produced by the voltage across the secondary 22 of the transformer 24 acting through the adjusting resistor 21.

Since this current through $a$ is proportional to the voltage of the A. C. source, which in turn is proportional to the voltage drop $e_g$ across the grid transformer secondary 28, then the deflection is a measure of the ratio $Ip/e_g = g$ which is the mutual conductance.

In all cases switch 7 is for the purpose of giving the proper phase relation to the field current, and in any practical set can be made to act simultaneously with the other switches, which also can be combined.

In all cases where current or voltage values are mentioned except where referring to A, B and C batteries, the alternating current component is meant. The direct current component of the plate current which passes through coils $a$ and $b$ cannot cause a deflection in the instrument, since they are acted upon solely by an A. C. field in coil 8. This is a simple means for eliminating the effect of the D. C. component in tube testers, resulting in a measurement of the A. C. component only which is desired.

I do not limit myself to any particular form of ratio meter. It may be of the iron core type. Nor do I limit myself to any particular frequency or voltage of alternating current, nor to any particular method of making connections. For instance, the field coil 8 in Fig. 3 could be energized by being connected in series with resistors 5 and 6 across the A. C. source as in Fig. 1, or connected to this source through an independent resistor, instead of being connected in the secondary 22 of the transformer.

In the specification and claims it is assumed that the tubes are supplied with the usual direct current plate, filament and grid voltages required for their operation. While I have described one form of ratio meter which may be employed in practicing the invention, it will be apparent that the particular design of the meter is not an essential feature of the invention. Obviously, the angular arrangement of the crossed coils may be varied, and the field coil may be used as the rotor element without departing from the scope of my invention as set forth in the following claims.

I claim:—

1. An electrical measuring instrument for vacuum tubes of the audion type comprising in combination, a ratio meter, means for connection to a source of alternating current, and means to impress on the ratio meter currents which are proportional to the electrical properties involved in the fundamental definition of a constant of the tube, whereby the value of the constant is directly indicated on a scale.

2. An electrical measuring instrument for vacuum tubes of the audion type comprising in combination, a ratio meter, means for connection to a source of alternating current, means to apply simultaneously to the coils of the ratio meter currents having values dependent upon the tube constant and a scale on the instrument calibrated directly in terms of the tube constant.

3. Apparatus for measuring a vacuum tube constant comprising a ratio meter, and means for passing through the coils thereof currents which are proportional, respectively, to the alternating potential applied across the input circuit of a vacuum tube and proportional to the alternating current response produced thereby in the output circuit of the tube, whereby a constant based on the relative values of the said currents may be directly read from the meter scale.

4. Apparatus for measuring a constant of a vacuum tube, which constant is based on the ratio of the value of a potential applied to the input terminals of the tube to the corresponding value of an electrical property of the output circuit, comprising a ratio meter, means for impressing an alternating potential across the input terminals of a tube and means for impressing across the coils of the ratio meter potentials which are proportional, respectively, to the simultaneous values of the two properties on whose ratio the constant is based.

5. Apparatus for measuring a constant of a vacuum tube, which constant is based upon ratio of the values of an alternating potential applied across the input terminals of the vacuum tube to the alternating current thereby produced in the output circuit, comprising a ratio meter having a pair of crossed coils, means for impressing an alternating potential upon the input terminals of a tube, means for passing through one coil of said ratio meter a current which is proportional to the impressed alternating potential, and means for passing through the other coil of said meter a current which is proportional to the alternating current established in the output circuit of the tube.

6. An electrical measuring instrument for vacuum tubes comprising in combination, a ratio meter, means for connection to a source of alternating current, means for supplying direct current to the tube circuits, means to impress alternating current on the grid circuit, and connections to the coils of the ratio meter from the tube circuits so arranged that a desired tube constant may be ascertained by the effect of the alternating current on the ratio meter.

7. In an electrical system for measuring the constants of a vacuum tube, means whereby the usual direct current is supplied to the tube circuits, means for superposing alternating current on some of the tube circuits, and means connecting the coils of an alternating current ratio meter in series with one tube circuit and in a circuit connected to another tube circuit, respectively, whereby the relative effects of the alternating currents may be indicated on the meter.

8. In an electrical system for measuring the constants of vacuum tubes, means whereby the usual direct current may be supplied to the tube circuits, means for impressing alternating current on the tube input circuit, and an alternating current ratio meter having one coil in series with one tube circuit and its other coil connected with a second tube circuit.

9. An electrical measuring instrument for vacuum tubes comprising in combination, an alternating current ratio meter, means for supplying alternating and direct current to the tube circuits and means connecting the ratio meter to certain of the tube circuits, whereby the proportional effects of the alternating current in the said circuits is indicated.

10. An electrical measuring instrument for vacuum tubes of the audion type comprising in combination, a ratio meter, means for applying thereto currents directly proportional to the values of the electrical properties involved in the fundamental definition of the tube constant to be measured, and means for indicating directly the tube constant.

11. An electrical measuring instrument for vacuum tubes comprising in combination a ratio meter, means for connection to a source of alternating current, means for connection to sources of direct current for the tube circuits, means to superpose alternating current on certain of the tube circuits, means to connect the coils of the ratio meter in series with a tube circuit and in a circuit connected to a tube circuit, respectively, and means to supply alternating current to the field of the ratio meter, whereby the alternating currents only are effective on said meter, and the deflection thereof is in terms of the tube constant.

12. A system for measuring the constants of a vacuum tube of the audion type, comprising a crossed-coil ratio meter, means for applying a source of alternating current to the field thereof, means including a variable resistor for supplying a current to one coil of the meter proportional to the product of the grid voltage and amplification factor, and means for supplying current to the other coil of the meter proportional to the grid voltage, whereby the amplification factor may be read directly from a calibrated scale.

13. A system for measuring the constants of a vacuum tube of the audion type, comprising a crossed-coil ratio meter, means for applying alternating current to the field thereof, means for supplying to one coil of said meter a current proportional to the grid voltage multiplied by the amplification factor, and means for supplying to the other coil of said meter current from the plane circuit, whereby the plate impedance may be read directly from a calibrated scale.

14. A system for measuring the constants of a vacuum tube of the audion type, comprising a crossed-coil ratio meter, means for applying alternating current to the field thereof, means for passing the plate current of a tube through one coil of said meter, and means for passing through the other coil a current proportional to the grid voltage, whereby the mutual conductance may be read from a calibrated scale.

15. An electrical measuring instrument for measuring constants of a vacuum tube comprising a ratio meter having an indicator of which the reading is dependent upon the relative strengths of two currents, and an electrical circuit associated with the vacuum tube of which a constant is to be measured for passing through said ratio meter two currents so related by virtue of said electrical circuit that their relative strengths determine a constant of said vacuum tube, whereby said indicator directly reads said constant.

16. An electrical measuring instrument for measuring constants of a vacuum tube comprising a ratio meter having two coils in fixed angular relation to each other and adapted for movement in unison relative to a field coil, and an electrical circuit associated with the vacuum tube of which a constant is to be measured for passing a current through each of said coils, said currents in the two coils being so related by virtue of said electrical circuit that their relative strengths determine a constant of said vacuum tube.

17. An electrical measuring instrument for measuring constants of a vacuum tube comprising a ratio meter having two coils in fixed angular relation to each other and adapted for movement in unison relative to a field coil, an electrical circuit for impressing an alternating potential between the grid and filament electrodes of the vacuum tube of which a constant is to be measured, an electrical circuit for impressing across one coil of said ratio meter an alternating potential bearing a known relation to said alternating potential impressed between the grid and filament electrodes of said vacuum tube, and an electrical circuit for connecting the other coil of said ratio meter in series with the alternating current path between the plate and filament electrodes of said vacuum tube, whereby the relative strengths of the currents in said two coils determine a constant of said tube.

18. An electrical measuring instrument for measuring constants of a vacuum tube comprising a ratio meter having two coils in fixed angular relation to each other and adapted for movement in unison relative to a field coil, an electrical circuit for impressing an alternating potential between the grid and filament electrodes of the vacuum tube of which a constant is to be measured, an electrical circuit for impressing an alternating potential of the same frequency and substantially the same phase as said first mentioned alternating potential and having a known relation thereto across one of said ratio meter coils, an electrical circuit for impressing an alternating potential of the same frequency and substantially the same phase as said above mentioned alternating potentials upon the field coil of said ratio meter, and an electrical circuit for connecting the other coil of said ratio meter in series with the plate circuit of said vacuum tube, whereby the reading of said ratio meter is dependent upon only the alternating currents flowing therein, said currents being so related by virtue of said electrical circuits as to determine a constant of said vacuum tube.

19. A system for measuring the amplification factor of a vacuum tube of the audion type which comprises means for applying an alternating current voltage to the field coil of a crossed-coil ratio meter, means for applying an alternating current voltage to the grid of a tube, means for applying an alternating current voltage to the plate circuit, means for passing the resultant plate current through one coil of the ratio meter, means for passing through the other coil of said meter a current to control the zero position of the meter hand, means for adjusting the voltage applied in the plate circuit until the meter indicates zero plate current and consequently that the said directly-applied voltage exactly balances the voltage generated in the plate circuit by the grid voltage, whereby the ratio of the said voltage applied to the plate circuit to the grid voltage may be read on said meter.

20. A system for measuring the plate impedance of vacuum tubes of the audion type, which comprises means for applying a source of alternating current to the field coil of a crossed-coil ratio meter, means for applying an alternating current voltage to the grid of the tube, means for applying an alternating current voltage to the plate circuit, means for passing the resulting plate current through one of the coils of the ratio meter, means for passing through the other coil of said meter a current to control the zero position of the meter hand, means for adjusting the voltage applied to the plate circuit until the meter indicates zero plate current and consequently that the said voltage exactly balances the voltage generated in the plate circuit by the grid voltage, means for passing a current proportional to the grid voltage multiplied by the amplification factor through one coil of the meter and the plate current generated thereby through the other coil, whereby the meter will indicate directly the plate impedance.

21. A system for measuring the mutual conductance of vacuum tubes which comprises means for applying an alternating current voltage to the grid of the tube, means for passing the resulting plate current through one coil of a crossed-coil ratio meter, and means for passing a current proportional to the grid voltage through the other coil thereof, whereby the ratio meter will indicate directly the mutual conductance.

22. An electrical instrument for measuring the constants of vacuum tubes of the audion type, comprising a crossed-coil ratio meter having a plurality of scales, means for applying a source of alternating current to the field thereof, means for supplying a current proportional to the grid voltage of the tube to one coil of said meter, and a circuit including switching means for selectively supplying to the other coil of said meter currents whose ratios to the current passed through the first coil determine the amplification factor, the plate impedance or the mutual conductance of the tube, respectively, whereby the said tube constants may be read from the appropriate meter scale.

In testimony whereof, I affix my signature.

WILLIAM NELSON GOODWIN, Jr.